United States Patent [19]

Takagi et al.

[11] Patent Number: 4,543,574
[45] Date of Patent: Sep. 24, 1985

[54] SYSTEM FOR RESOLVING COLLISION IN LOCAL NETWORK

[75] Inventors: Akihiro Takagi; Shinichi Yamada; Syohei Sugawara, all of Kanagawa, Japan

[73] Assignee: Nippon Telegraph & Telephone Public Corporation, Tokyo, Japan

[21] Appl. No.: 424,532

[22] Filed: Sep. 27, 1982

[30] Foreign Application Priority Data

Sep. 28, 1981 [JP] Japan .................................. 56-151972
Nov. 17, 1981 [JP] Japan .................................. 56-184112
Nov. 17, 1981 [JP] Japan .................................. 56-184113

[51] Int. Cl.$^4$ ........................... H04Q 9/00; H04J 6/00
[52] U.S. Cl. .................................... 340/825.5; 370/85
[58] Field of Search ........... 340/825.5, 825.51, 825.05; 370/4, 60, 94, 86, 85

[56] References Cited

U.S. PATENT DOCUMENTS 4,063,220 12/1977 Metcalfe et al. .
4,271,507  6/1981 Gable et al. ............................ 370/94
4,412,326 10/1983 Limb ................................. 340/825.5
4,432,088  2/1984 Frankel ............................ 340/825.5

Primary Examiner—Donald J. Yusko
Attorney, Agent, or Firm—Roberts, Spiecens and Cohen

[57] ABSTRACT

The invention provides a method for resolving a data packet collision in a local network where a plurality of nodes which respectively comprise processors and terminal equipment utilize a single transmission line in accordance with a contention system.

A contention phase is initiated unless a collision occurs. When a collision occurs, a resolution phase is initiated. The nodes which have been performing transmission immediately stop transmission. They discriminate their positions on the transmission line before a time interval (2×maximum transmission delay time interval) elapses from the start of transmission. If no signal is received by a given node from the left, the given node is regarded as the leftmost node among the conflicting nodes. The leftmost node immediately starts transmitting a packet. Other nodes except for the leftmost node stop retransmitting the packets. The nodes which have performed retransmission are stopped until the resolution phase is completed. The nodes except for the leftmost node receive retransmitted packets and immediately send out short reservation signals to the right. A node which does not receive the reservation signal from any other node during the reservation signal transmission is the leftmost node among the nodes which may not perform retransmission, and performs retransmission immediately after the reservation signal is sent out. Retransmission of the packet and transmission of the reservation signal are repeated. When the final conflicting node finishes retransmission, all of the nodes complete transmission. Each node continuously monitors the transmission line. When a nonsignalling period continues for more than a given time period (2×maximum propagating delay time interval), another contention phase is initiated.

9 Claims, 10 Drawing Figures

SYSTEM FOR RESOLVING COLLISION IN LOCAL NETWORK

BACKGROUND OF THE INVENTION

I. Field of the Invention

The present invention relates to a system for resolving a collision occurring in a local network wherein a data packet is transferred between node stations among a plurality of node stations which use a single transmission line and comprise processors or terminal equipment, in accordance with the contention system, when at least two node stations essentially concurrently transmit the packets.

II. Description of the Prior Art

In the local network using the contention system, (1) the node stations continuously monitor the transmission line and respectively receive data packets when such packets are transmitted thereto, and (2) in response to a transmission request, the corresponding node station transmits data if the transmission line is kept in the non-signalling state. However, it takes time for any other node station to receive a signal from a given node station after the given station begins transmitting the signal, due to a propagation delay along the transmission line. Therefore, at least two node stations may begin transmitting data before one of them detects a signal transmitted from the other. Thus, a collision takes place on the transmission line.

A system for detecting the collision and for restarting transmission is disclosed in U.S. Pat. No. 4,063,220.

According to this system, an incoming signal is compared with an outgoing signal. If they are the same, the system detects that no collision is occurring. However, if they differ from each other, the system detects that a collision is taking place. In this system, however, if conflicting stations are apart from each other, the signal level of the outgoing signal greatly differs from that of the collision signal, resulting in a failure to detect the collision.

After the collision is detected, retransmission is generally performed. However, in the U.S. patent described above, the conflicting node stations respectively generate independent random numbers, and stop transmission for a predetermined time interval in accordance with the random numbers. When the predetermined time interval has elapsed, retransmission is performed. Thus, the possibility of recollision in the retransmission process is decreased. However, when the range of random numbers is narrowed, the possibility of recollision is increased on the basis of the corresponding processing time. On the other hand, if the range of random numbers is widened, the waiting time must be increased, thus lowering the efficiency of use of the transmission line. Furthermore, the retransmission may not be successfully performed immediately; a time interval required from the transmission request to the completion of transmission greatly varies in a high traffic time interval.

SUMMARY OF THE INVENTION

It is a first object of the present invention to provide a highly reliable method for resolving a collision, wherein after the collision has been detected, a recollision is completely prevented in retransmission of the same data so as to provide a high transmission efficiency.

It is a second object of the present invention to provide a method for resolving a collision wherein a collision is readily detected and positions of conflicting node stations between which the collision occurs are readily detected.

According to the present invention, in order to readily detect a collision of signals when a given node station transmits a signal therefrom and at the same time another signal is transmitted from any other node station thereto, a receiver/transmitter circuit of the given node is divided into a left transmitter circuit for transmitting a signal to the left, a right transmitter circuit for transmitting a signal to the right, a right receiver circuit for receiving a signal from the right and a left receiver circuit for receiving a signal from the left, all of which are connected to the transmission line so that a signal which is transmitted by the left transmitter circuit may not be received by the right receiver circuit thereof, and so that a signal which is transmitted by the right transmitter circuit of the given node station may not be received by the left receiver circuit thereof, wherein the word "right" denotes one direction along a transmission line, the word "left", the other direction. If the given node station receives any signal during transmission, this signal indicates a collision. Furthermore, by checking which receiver circuit receives the collision signal, the direction of the collision signal source, that is, from right to left along the transmission line or from left to right therealong can be discriminated.

When a collision occurs among conflicting node stations (stations which substantially start transmitting data essentially concurrently), retransmission is started from the leftmost node station (or rightmost node station) to prevent recollision. The leftmost node station (or rightmost node station) involved in the collision starts retransmitting the packet. Other conflicting node stations respectively transmit short reservation signals to the right or left after retransmission by the leftmost or rightmost node station is completed. A conflicting node station which did not receive the reservation signal transmits the packet after it has sent out its own reservation signal. Furthermore, other conflicting node stations which received reservation signals while transmitting their own reservation signals interrupt transmission of their own reservation signals and wait until the node station which did not receive the reservation signal completes retransmission of the packet. The operation described above is repeated. When the final node station completes retransmission, the collision is resolved.

The other objects, features and advantages of the present invention will be apparent from the following description taken in conjunction with the accompanying drawings.

DETAILED DESCRIPTION OF THE PREFFERRED EMBODIMENTS

Figure 1:
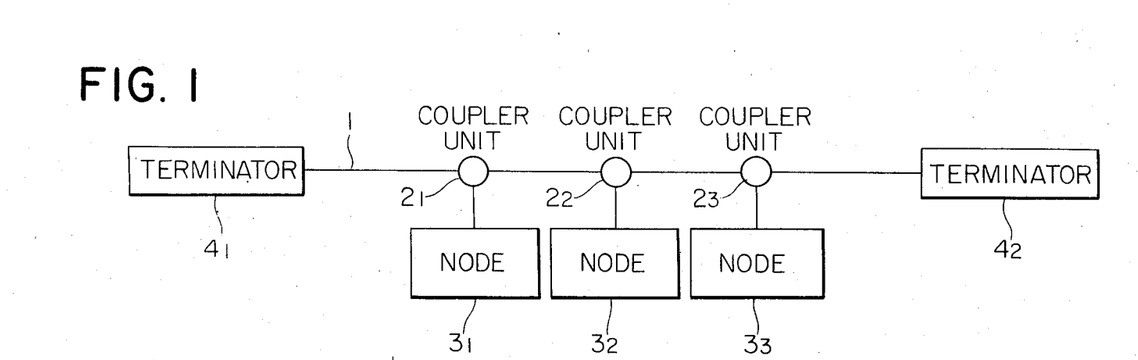
FIG. 1 is a schematic view showing a local network to which the present invention is applied.
Figure 2:
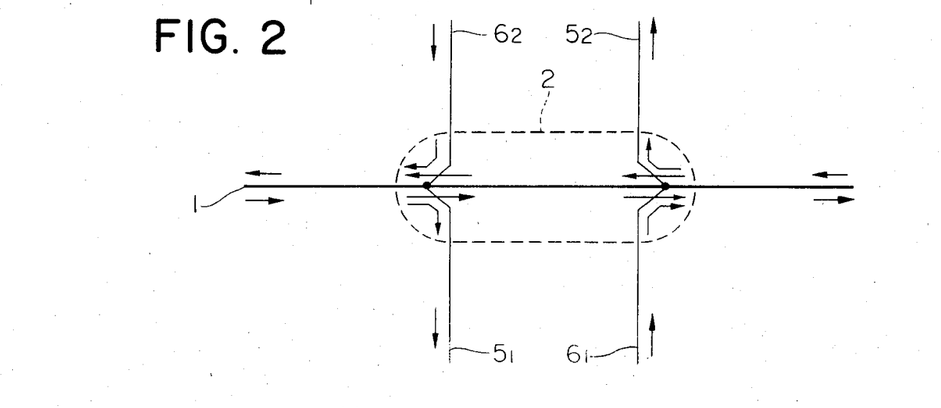
FIG. 2 is a view showing an example of a coupler unit which is used in a bidirectional transmission line to detect a collision, so as to describe the data stream.

FIG. 1 schematically shows a local network to which the present invention is applied. A plurality of node stations (to be referred to as nodes hereinafter) $3_1$, $3_2$ and $3_3$ which comprise processors and terminal equipment are connected to a transmission line 1 of an optical fiber through coupler units $2_1$, $2_2$ and $2_3$ respectively. Terminators $4_1$ and $4_2$ are respectively connected to the two ends of the transmission line 1. FIG. 2 shows functions of the coupler unit, and the flow of light signals are indicated by the arrows. A coupler unit 2 has a reception waveguide $5_1$ which receives a signal transmitted from the left, a reception waveguide $5_2$ which receives a signal transmitted from the right, a transmission waveguide $6_1$ which transmits a signal to the right, and a transmission waveguide $6_2$ which transmits a signal to the left. These waveguides $5_1$, $5_2$, $6_1$ and $6_2$ are connected to have transmission directivity. A phototransmitter (not shown) for transmitting the packet to the right and a phototransmitter (not shown) for transmitting the packet to the left are respectively connected from a node to the transmission waveguides $6_1$ and $6_2$. Similarly, a photoreceiver (not shown) for receiving the packet from the left and a photoreceiver (not shown) for receiving the packet from the right are respectively connected to the reception waveguides $5_1$ and $5_2$. Since the transmission waveguide $6_1$ is located to the right of the reception waveguide $5_1$, that is, downstream of signals transferred from the left to right, a signal transmitted by the transmission waveguide $6_1$ onto the transmission line 1 may not be received by the reception waveguide $5_1$. Similarly, a signal transmitted by the transmission waveguide $6_2$ onto the transmission line 1 may not be received by the reception waveguide $5_2$.

As described above, in the coupler unit shown in FIG. 2, the signal transmitted by a given node may not be received thereby.

Referring to FIG. 1, when the node $3_1$ is already in the transmission mode, and the node $3_2$ starts transmitting the packet, a collision occurs between the nodes $3_1$ and $3_2$. In this state, the node $3_1$ or $3_2$ respectively receives a signal from the other. Thus, the collision is detected only by detecting a signal while transmitting the packet.

Figure 3:
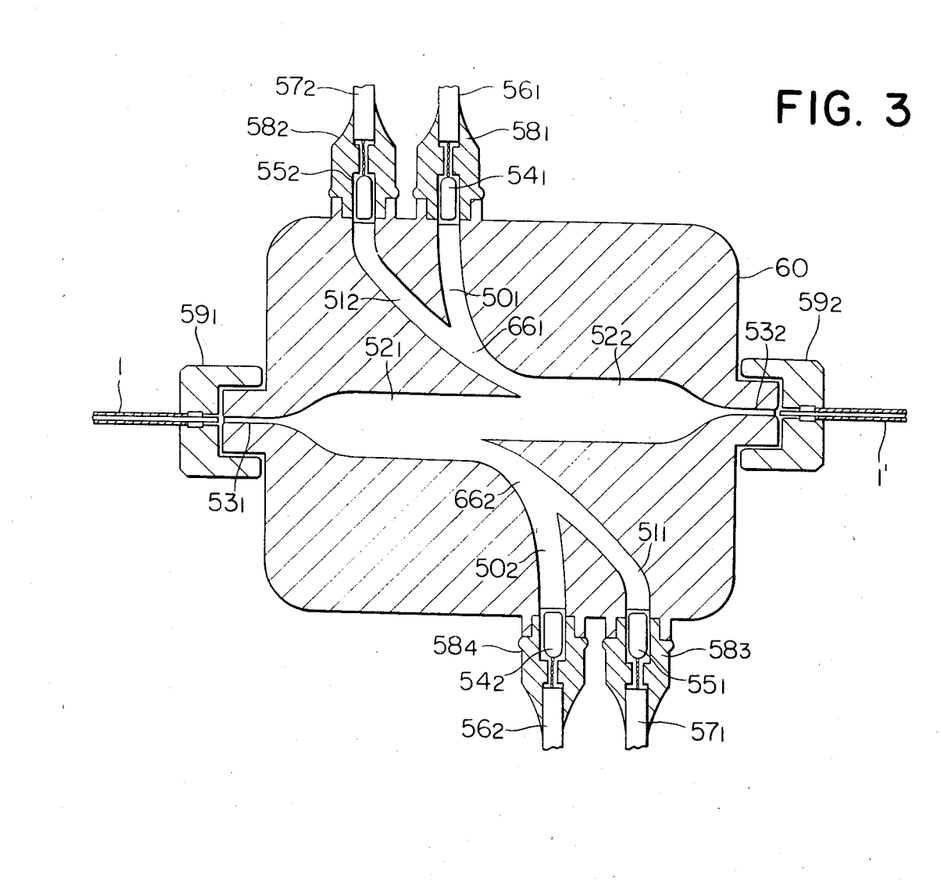
FIG. 3 is a sectional view showing the detailed configuration of the coupler unit shown in FIG. 2.

FIG. 3 shows a detailed structure of the coupler unit shown in FIG. 2. The coupler unit has a box body 60 which has polymer waveguides $51_1$, $51_2$, $50_1$, $50_2$, $52_1$, $52_2$, $66_1$, $66_2$, $53_1$ and $53_2$ therein, connectors $59_1$ and $59_2$ for connecting transmission lines 1 and 1' of optical fibers to the waveguides $53_1$ and $53_2$ of the box body 60, and connectors $58_1$, $58_2$, $58_3$ and $58_4$ for respectively connecting connecting cables $56_1$, $56_2$, $57_1$ and $57_2$ to the box body 60. Phototransmitters $54_1$ and $54_2$ which respectively comprise laser diodes (or light-emitting diodes) are arranged in the connectors $58_1$ and $58_4$ to convert electrical signals sent by way of the connecting cables $56_1$ and $56_2$ into light signals. Photoreceivers $55_1$ and $55_2$ which respectively comprise photodiodes are arranged in the connectors $58_2$ and $58_3$ to convert light signals into electrical signals. A signal transmitted to the outside of the node is supplied as an electrical signal to the phototransmitters $54_1$ and $54_2$ by way of the transmission waveguides $66_1$ and $66_2$. Thus, the light signals are transmitted to the transmission waveguides $50_1$ and $50_2$. The light signals are then transmitted to the branch/line concentrator waveguides $52_2$ and $52_1$ respectively via the waveguides $66_1$ and $66_2$ and to the transmission lines 1 and 1'. The phototransmitter $54_1$ performs transmissions to the right, while the phototransmitter $54_2$ performs transmissions to the left. On the other hand, the photoreceivers $55_1$ and $55_2$ detect the signals transmitted to the reception waveguides $51_1$ and $51_2$ from the transmission lines 1 and 1' respectively via the waveguides $52_1$ and $52_2$, produce corresponding elcctrical signals, and supply them onto the connecting cables $57_1$ and $57_2$. The photoreceiver $55_1$ may not receive the signal transmitted by the phototransmitter $54_1$ and the photoreceiver $55_2$ may not receive the signal transmitted by the phototransmitter $54_2$.

Figure 4:
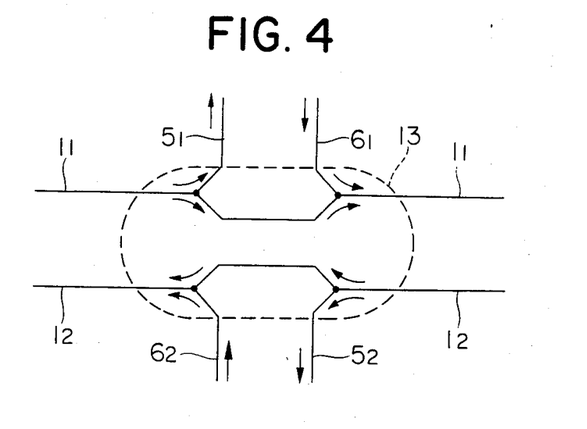
FIG. 4 is a view showing another example of a coupler unit which is used in a unidirectional transmission line, so as to describe the data stream.

FIG. 4 shows another example of a coupler unit which has independent right- and left-hand side transmission lines. Reference numeral $1_1$ denotes a transmission line to the right; $1_2$, a transmission line to the left; $5_1$, a waveguide for receiving a signal from the left; $5_2$, a waveguide for receiving a signal from the right; $6_1$, a waveguide for transmitting a signal to the right; $6_2$, a waveguide for transmitting a signal to the left; and 13, a branch/line concentrator. In the same manner as in the coupler unit shown in FIG. 2, the reception direction can be detected, and unidirectional or bidirectional transmission can be performed.

Figure 5:
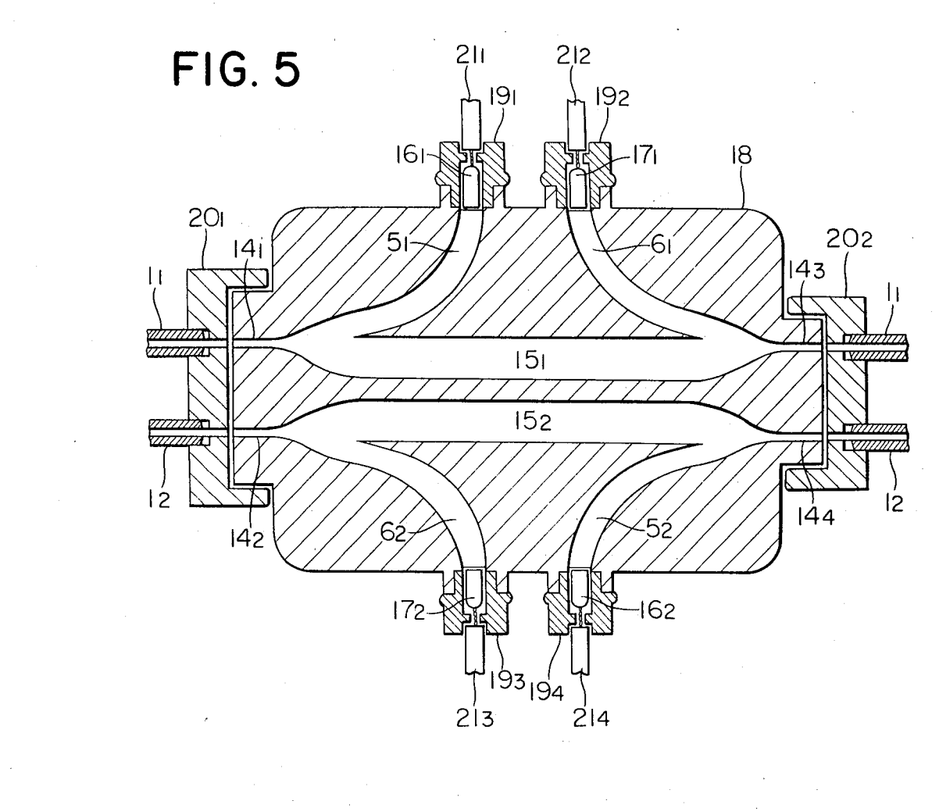
FIG. 5 is a sectional view showing a polymer optical waveguide circuit as the coupler unit shown in FIG. 4.

FIG. 5 shows a detailed configuration of the coupler unit with polymer waveguides shown in FIG. 4. Reference numerals $1_1$ and $1_2$ denote transmission lines of optical fibers; $5_1$, $5_2$, $6_1$, $6_2$, $14_1$ to $14_4$, $15_1$ and $15_2$, polymer waveguides; $16_1$ and $16_2$, photoreceivers which respectively comprise photodiodes; $17_1$ and $17_2$, phototransmitters which respectively comprise laser diodes or light-emitting diodes; 18, a coupler unit box body; $19_1$ to $19_4$, connectors for connecting the coupler unit to the connecting cables of the node; and $20_1$ and $20_2$, connectors for connecting the coupler unit to the transmission lines $1_1$ and $1_2$. Signals transmitted from one node to another are electrical signals which are transmitted to the phototransmitters $17_1$ and $17_2$ respectively via connecting cables $21_2$ and $21_3$, while light signals are transmitted to the transmission waveguides $6_1$ and $6_2$. The light signals are sent onto the transmission lines $1_1$ and $1_2$ respectively via the transmission waveguides $14_3$ and $14_2$. The phototransmitter $17_1$ performs transmissions to the right, while the phototransmitter $17_2$ performs transmissions to the left. The photoreceivers $16_1$ and $16_2$ detect signals transmitted onto the transmission waveguides $5_1$ and $5_2$ respectively via the waveguides $14_1$ and $14_2$ and respectively supply corresponding electrical signals to connecting cables $21_1$ and $21_4$. Therefore, the nodes respectively control the electrical signals on the four connecting cables, so that the transmission direction of the signal can be discriminated, and a unidirectional or bidirectional transmission can be performed.

Figure 6:
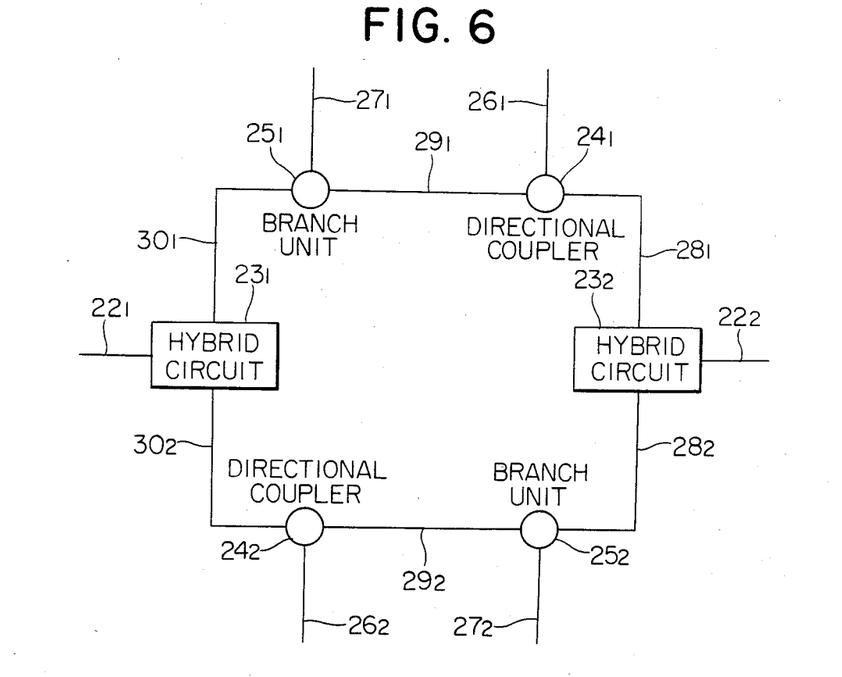
FIG. 6 shows an implementation of the coupler unit when a coaxial cable or a pair twinned wire is used as the transmission line.

When a light signal is used which has an excellent transmission directivity, a polymer optical circuit may be used as a coupler unit (FIG. 5) having a directional transmission/reception function. Alternatively, a T-coupler may also be used which has a prism and a mirror. When a coaxial cable or a pair twinned wire is used as the transmission line, an implementation which realizes the transmission directivity is required. FIG. 6 shows an example of the coupler unit (FIG. 2) with a directional coupler and a hybrid circuit in order to perform transmission utilizing a coaxial cable or a pair twinned wire, and using a directional coupler.

Referring to FIG. 6, reference numerals $22_1$ and $22_2$ denote transmission lines; $23_1$ and $23_2$, hybrid circuits; $24_1$ and $24_2$, directional couplers; $25_1$ and $25_2$, branch units; $26_1$ and $26_2$, transmission signal lines; $27_1$ and $27_2$, reception signal lines; and $28_1$, $28_2$, $29_1$, $29_2$, $30_1$ and $30_2$, signal lines. The signal from the left is propagated from the hybrid circuit $23_1$ through the signal lines $30_1$, $29_1$ and $28_1$. The signal then passes the hybrid circuit $23_2$ and is transmitted onto the transmission line $22_2$. However, the signal is not transmitted onto the signal lines $30_2$, $29_2$ and $28_2$. The signal from the right is propagated through the signal lines $28_2$, $29_2$ and $30_2$. The directional coupler $24_1$ sends the signal (via the signal line $29_1$) from the left and the transmission signal (via the signal line $26_1$) to the right. However, the signal is not transmitted from the transmission signal line $26_1$ to the signal line $29_1$. The signal received from the branch unit $25_1$ is a signal transmitted from the left. The signal from the right is transmitted in the same manner as described above with reference to the signal from the left. As a result, the implementation shown in FIG. 6 performs the same operation as described with reference to FIG. 2. In this case, separate transmission lines may be used in place of a single unidirectional transmission line to eliminate the hybrid circuits.

Figure 7:
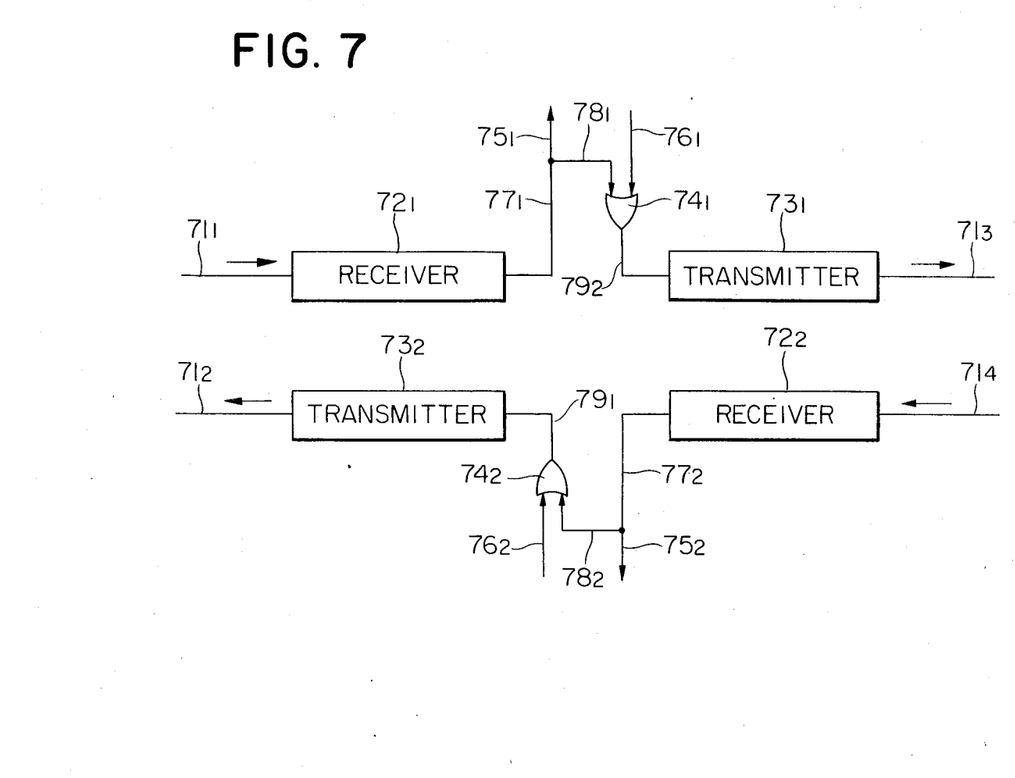
FIG. 7 is another implementation of the coupler unit wherein an optical fiber, a coaxial cable or a pair twinned wire is are used as the transmission line.

FIG. 7 shows another example of a coupler unit. In this case, the transmission line may comprise an optical fiber, a coaxial cable, or a pair twinned wire. Referring to FIG. 7, reference numerals $71_1$, $71_2$, $71_3$ and $71_4$ denote transmission lines; $72_1$ and $72_2$, receivers; $73_1$ and $73_2$, transmitters; $74_1$ and $74_2$, OR gates; $75_1$ and $75_2$, connecting cables which respectively transmit signals from the left and right; $76_1$ and $76_2$, connecting cables which respectively transmit signals to the right and left; and $77_1$, $77_2$, $78_1$, $78_2$, $79_1$ and $79_2$, signal lines. The signal on the transmission line $71_1$ which is received from the left is received and amplified by the receiver $72_1$ and is transmitted onto the signal line $77_1$. The signal transmitted onto the signal line $77_1$ is transmitted to the connecting cable $75_1$ and to the transmitter $73_1$ through the signal line $78_1$ and the OR gate $74_1$. The signal is then transmitted onto the transmission line $71_3$. On the other hand, the signal to the right is transmitted from the connecting cable $76_1$ to the transmitter $73_1$ through the OR gate $74_1$ and is supplied to the transmission line $71_3$. The reception from the right and the transmission to the left are performed in the same manner as described above, using the receiver $72_2$, the transmitter $73_2$, the OR gate $74_2$, the transmission lines $71_4$ and $71_2$, and the like. In the coupler unit of the above configuration, the signals from the left and right can be separately received and they can be arbitrarily transmitted in any direction. Furthermore, the coupler unit does not receive the signal which is transmitted therefrom.

According to the present invention, communication between the nodes is performed in two phases: (1) a contention phase; and (2) a resolution phase. Each node continuously supervises a signal on the transmission line 1 and is operated in accordance with the current phase. The mode of operation of the contention and resolution phases will be described below. Assume that the initial state is the contention phase.

(1) Operation in Contention Phase

A given node which intends to transmit a data packet supervises the signal on the transmission line 1. This node performs transmission when none of the other nodes is transmitting a data packet, that is, when the transmission line is kept in the nonsignalling state. However, when another node is performing transmission, the given node delays transmitting the data packet until it is finished. Thereafter, the given node performs transmission in right- and left-hand directions. Note that while the given node performs transmission, it receives a signal on the transmission line and supervises a collision. In the coupler units of the configurations shown in FIGS. 2 to 7, since the given node does not receive the data packet which is transmitted thereby, a collision is readily detected when the given node receives any data packet. If a shortest data packet length is so selected as to continue transmission of the shortest data packet for a time interval longer than a time period required for reciprocal transmission of the light signal between the nodes, a collision can be detected during the data packet transmission. When the collision is detected, this data packet is eliminated as an abnormal packet and is made shorter than the shortest data packet so as to allow detection of a collision by other nodes. Thereafter, the resolution phase is initiated. After other nodes receive the abnormal or collision packet, they are set in the resolution phase.

(2) Operation in Resolution Phase

Figure 8:
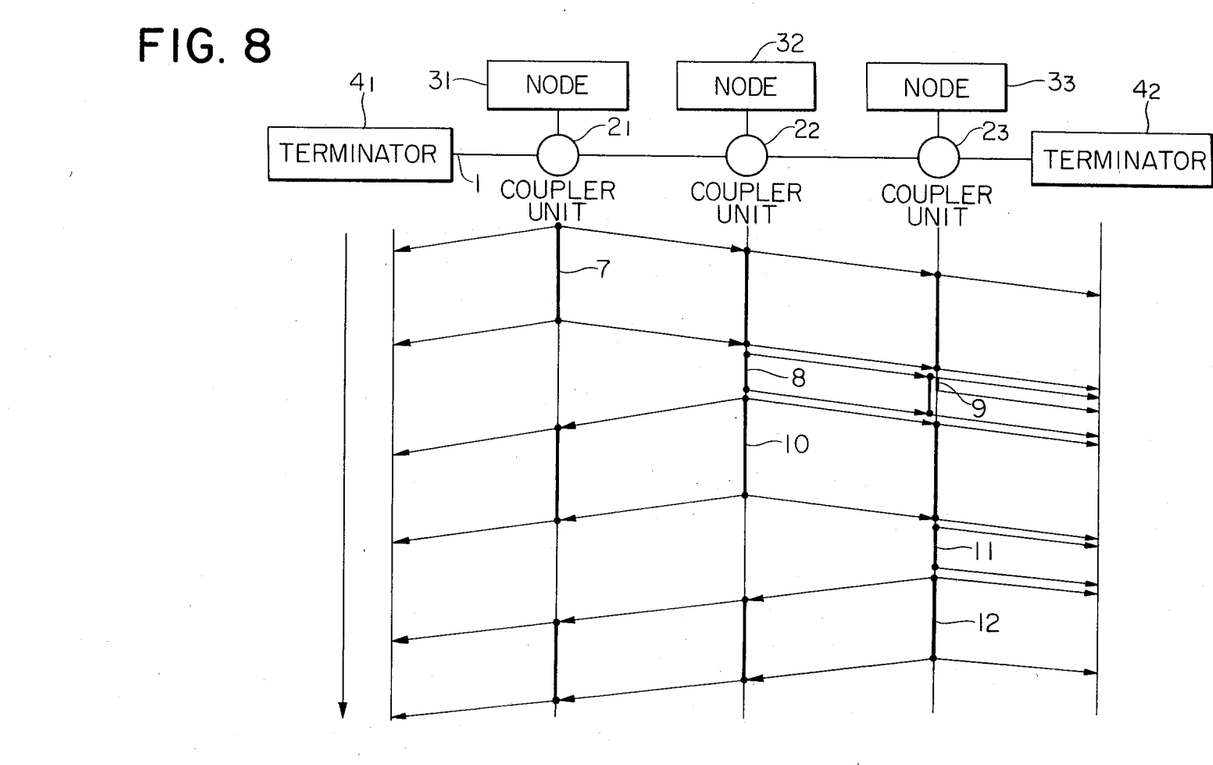
FIG. 8 is a view for explaining an example of the mode of operation in the contention/resolution phases, in which time is plotted along the axis of ordinate and signal propagation is plotted along the axis of abscissa.

FIG. 8 shows an example for explaining the mode of operation in the resolution phase of the nodes involved in a collision. For illustrative convenience, other nodes are omitted which are not involved in a collision. Reference numeral 1 denotes a transmission line; $2_1$ to $2_3$, coupler units, and $3_1$ to $3_3$, nodes between which a collision occurs. A packet 7 which is transmitted by the node $3_1$ is transmitted to the right-and left-hand sides. A reservation signal 8 sent by the node $3_2$ is transmitted only to the right-hand side. A reservation signal 9 sent by the node $3_3$ is also transmitted only to the right-hand side. A packet 10 transmitted by the node $3_2$ is transmitted to the right-and left-hand sides. A reservation signal 11 sent by the node $3_3$ is transmitted only to the right-hand side. A packet 12 transmitted by the node $3_3$ is sent to the right- and left-hand sides.

The mode of operation is as follows. When a collision occurs, the node $3_1$ receives collision packets from the nodes $3_2$ and $3_3$. However, the node $3_1$ receives nothing from the left. Similarly, the node $3_3$ receives collision packets from the nodes $3_1$ and $3_2$, but it receives nothing from the right. Therefore, the node $3_1$ is regarded as being located at the leftmost position of the collision node array, whereas the node $3_3$ is regarded as being located at the rightmost position thereof. The leftmost node $3_1$ delays a transmission until the transmission line 1 is returned to the nonsignalling state. The node $3_1$ then starts transmitting the packet 7 to the right- and left-hand sides. When the node $3_1$ finishes the transmission, it returns to the receiving state. The node $3_1$ will not perform further transmission until the resolution phase is completed. Meanwhile, the nodes $3_2$ and $3_3$ receive the packet from the node $3_1$, and then respectively send the short reservation signals 8 and 9 to the right. When the node $3_3$ receives the reservation signal 8, it immediately stops producing the reservation signal 9. The node $3_3$ then waits until the collision node $3_2$ located to the left thereof completes transmission of the packet 10. Since the node $3_2$ does not receive a reservation signal from the left, it transmits the reservation signal 8 and continuously transmits the packet 10 to the right- and left-hand sides. After the node $3_3$ has received the packet 10 transmitted by the node $3_2$, the node $3_3$ transmits the reservation signal 11 to the right. At this time, since the node $3_3$ does not receive any reservation signal from the left, it transmits the reservation signal 11 and continuously transmits the packet 12 to the right- and left-hand sides. When the node $3_3$ has completed transmission of the packet 12, the transmission line 1 is returned to the nonsignalling state since no further collision node is present which is awaiting transmission. All the nodes connected to the transmission line 1 detect a sufficiently long nonsignalling period (the sum of a period in which the light signal reciprocates between the rightmost and leftmost nodes and a period in which the reservation signal is sent out) of the transmission line 1, to determine that the resolution phase is completed. Thus, another contention phase is initiated. During the resolution phase, nodes other than the collision nodes stop transmission.

In the above example, transmission is sequentially performed from the leftmost node $3_1$. However, it is possible to start transmission from the rightmost node $3_3$. In this case, the order described above is reversed.

The end of a packet transmitted from the node may be indicated by adding a special code array to the end of the packet. Alternatively, the end of a packet transmission may also be indicated by the nonsignalling period. In particular, in the above example, the end of the resolution phase is indicated by the nonsignalling period. The rightmost node is known as the final node due to its position, so that it is possible to indicate the end of the phase by sending a special signal or code array to all the nodes. Furthermore, the leftmost node transmits the packet without receiving a reservation signal in the resolution mode. However, the leftmost node may transmit the reservation signal in the same manner as do the remaining nodes. In the above example, the reservation signals are transmitted only to the right-hand side. However, the reservation signals may be transmitted to the right- and left-hand sides, provided that, in order to prevent interference between the reservation signal and the packet which are transmitted by different nodes, the sum of a reservation signal transmission time interval and a packet transmission time interval after the transmission of the reservation signal must be longer than the sum of a time interval in which the light signal reciprocates between the rightmost and leftmost nodes and a time interval in which a given node stops sending the reservation signal after it receives another reservation signal from the left. In this case, however, the efficiency of use of the transmission line is degraded.

Figure 9:
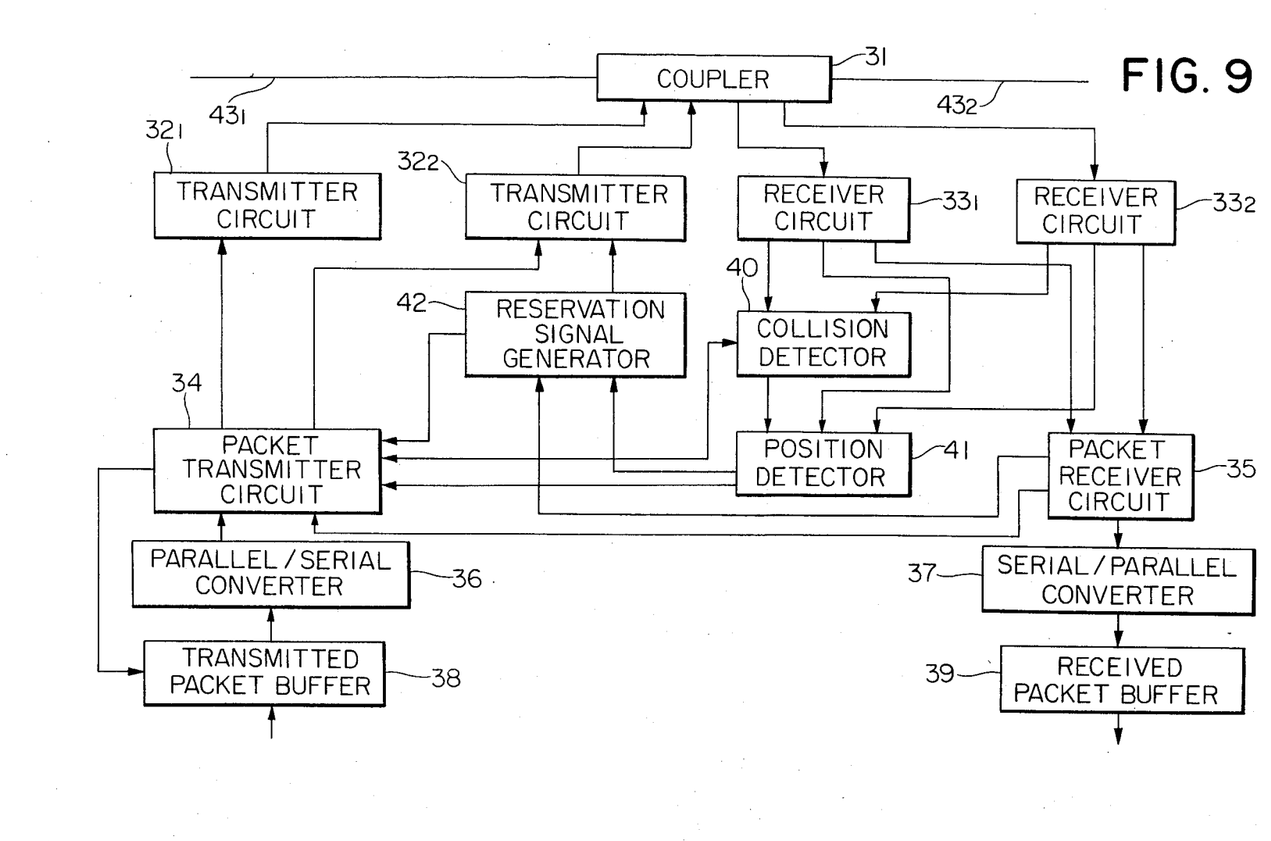
FIG. 9 is a block diagram of a transmission control to which a system for resolving a collision of the present invention is applied.

FIG. 9 is a detailed block diagram of a transmission control utilizing the method for resolving a collision according to the present invention. The processor and terminal equipment of the node are connected to an interface circuit via a buffer for a transmitted/received packet. Reference numeral 31 denotes a coupler; $32_1$, a transmitter circuit for transmitting data to the left; $32_2$, a transmitter circuit for transmitting data to the right; $33_1$, a receiver circuit for receiving data from the left; and $33_2$, a receiver circuit for receiving data from the right. Reference numerals 34 and 35 denote respectively packet transmitter and receiver circuits which perform preamble and error detecting code operations. Reference numeral 36 denotes a parallel/serial converter; 37, a serial/parallel converter; 38, a transmitted packet buffer; and 39, a received packet buffer. The packet is stored as parallel data in the buffers 38 and 39. Reference numeral 40 denotes a collision detector; 41, a position detector for detecting a position of a collision node to produce three types of information (i.e., leftmost information, intermediate information and rightmost information); 42, a reservation signal generator; and $43_1$ and $43_2$, transmission lines. When a packet collision occurs, the collision detector 40 detects the collision through detection of a signal at one of the receiver circuits $33_1$ and $33_2$. A detection signal from the collision detector 40 is supplied to the transmitter circuit 34 which then stops transmitting the packet. The position detector 41 detects the position of a collision node through which one of the receiver circuits $33_1$ and $33_2$ has received the signal. If the position detector 41 detects the leftmost node among the collision nodes, it produces a position signal indicating the position of the leftmost node to the packet transmitter circuit 34. The packet transmitter circuit 34 immediately restarts transmitting the packet in response to the position signal. Otherwise, after the receiver circuit 35 has received one packet, the reservation signal generator 42 is energized. The reservation signal generator 42 generates a reservation signal to the right. When the reservation signal generator 42 finishes transmission, the packet transmitter circuit 34 restarts transmitting the packet. If the node receives a reservation signal from the left while the reservation signal is generated by the reservation signal generator 42, the position detector 41 detects it. In response to a detection signal, the reservation signal generator 42 stops generating the reservation signal and waits until transmission of one packet is completed. The reservation signal generator 42 repeats the above operation in response to a reception end signal from the packet receiver circuit 35. After the collision occurs, the packet transmitter circuit 34 does not transmit the packet, except when the packet transmitter circuit 34 is activated by the reservation signal generator 42 and the position detector 41, until all of the conflicting nodes which are involved in the collision confirm the end of the packet transmission (this confirmation is performed by the nonsignalling time interval which is detected by the packet receiver circuit 35).

As described above, in the resolution mode, retransmission is sequentially performed in the conflicting nodes from the end node so that the waiting time interval for retransmission can be shortened and the retransmission is properly performed without failure. Furthermore, even when the transmission line is busy, the efficiency of use of the system may not be degraded. At the same time, the transmission can be performed within a predetermined time interval.

Figure 10:
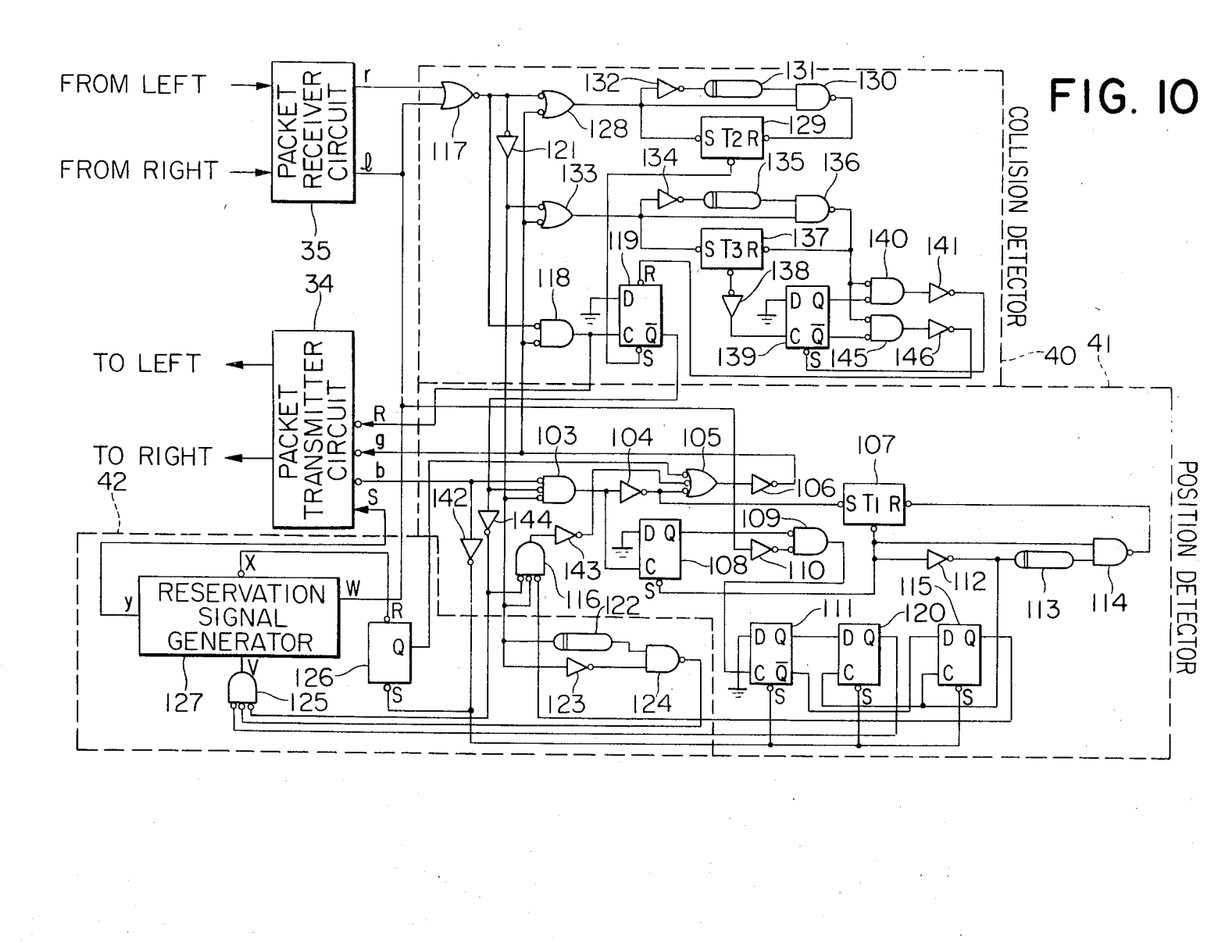
FIG. 10 shows an implementation of part of the circuit in FIG. 9, which comprises the collision detector, the position detector, and the reservation signal generator.

FIG. 10 shows an implementation of part of the circuit in FIG. 9, which comprises the collision detector, the position detector, and the reservation signal generator.

The present invention is practiced in a hardware manner by the circuit shown in FIG. 10. However, the operation of the circuit may be easily replaced by a processor program which controls the transmitter and receiver circuits, which is apparent to those who are skilled in the art.

A packet transmitter circuit 34 can be readily formed by conventional circuitry techniques. If there exists a packet to be transmitted, an output signal "b" is ON (negative logic). When an input signal "g" is ON, the packet is transferred to the right and the left. However, when the input signal "g" goes high during transmission, the packet transmission is stopped. When the input signal "g" is ON again, the packet transmitter circuit 34 retransmits the packet whose transmission has been temporarily stopped. However, when a pulse is supplied as an input signal "R", the packet is transmitted from the beginning in response to the ON state of the input signal "g". An input signal "s" is sent out to the right. Reference numeral 35 denotes a packet receiver circuit which can be readily formed by the conventional circuitry techniques in the same manner as the transmitter circuit 34. The receiver circuit 35 receives input signals from the left and the right and produces an output signal "l" and an output signal "r", respectively.

The mode of operation of the circuit shown in FIG. 10 is performed as follows. If there exists a packet to be transmitted, the input signal "b" is ON. However, if no input signal is received by the receiver circuit 35, that is, if the output signals "r" and "l" are OFF (positive logic), a NOR gate 117 is OFF. When a D flip-flop 119 is set, an AND gate 103 is ON. The ON output from the AND gate 103 is supplied as the signal "g" of low level to the terminal of the transmitter circuit 34 through an OR gate 105 and an inverter 106. Thus, when the output signals "r" and "l" are OFF, the transmitter circuit 34 performs transmission. Since the AND gate 103 is ON, the clock terminal of a D flip-flop 108 goes high, while the delay terminal D thereof goes low. The output Q of the D flip-flop 108 goes low. The output from an inverter 104 then goes low, and the set input terminal S of a timer 107 goes low. Thus, the timer 107 is started. The timer 107 is formed by the conventional circuitry techniques: when the set input terminal S goes low, the timer 107 is started to produce a clock pulse after time interval T1. When the reset input terminal R of the timer 107 goes low, the timer 107 is cleared. The timer 107 is reset by a pulse produced by a differentiator which comprises an inverter 112, a delay element 113 and a NAND gate 114 when the clock pulse of the timer 107 rises. The time interval T1 is the sum of a time interval required for a signal to reciprocate between the rightmost and leftmost nodes and a delay time interval required for operation of the circuit shown in FIG. 10. The shortest packet length is so determined that transmission time of the packet exceeds the time interval T1. When the transmission is completed without trouble, the output signal "b" goes high, and the input signal "g" goes low through the AND gate 103, the inverter 104, the OR gate 105 and the inverter 106. However, when a collision occurs, collision signals from other nodes reach the receiver circuit 35 within the time interval T1 after transmission is started. The output Q of the D flip-flop 108 is kept low until the output pulse from the timer 107 is supplied to the set input terminal S of the D flip-flop 108. If the collision signal is received only from the right, the output signal "r" from the receiver circuit 35 is kept low. The output from an AND gate 109 is also kept low. Thus, the output $\overline{Q}$ from a D flip-flop 111 is kept low. However, when a collision signal is received from the right, the output signal "r" from the receiver circuit 35 goes high, and the output from the NOR gate 117 goes low, which causes the AND gate 103 to be OFF through an inverter 121. The input signal "g" to the transmitter circuit 34 goes high, and the transmitter circuit 34 stops transmission. If a delay time interval from the ON state of the NOR gate 117 to the OFF state of the input signal "g" is defined as d, an AND gate 118 produces a pulse of a pulse width corresponding to the delay time interval d. The pulse is supplied to the clock input terminal C of a D flip-flop 119. Since the input terminal D is kept low, the output $\overline{Q}$ of the D flip-flop 119 goes high. The output pulse from the AND gate 118 causes the transmitter circuit 34 to initialize through the input terminal which receives the input signal "R". After the time interval T1 has elapsed from the beginning of transmission, a clock pulse is generated from the output terminal of the timer 107. The clock pulse is applied to the clock input terminal C of a D flip-flop 115 through the inverter 112, so that the output $\overline{Q}$ from the D flip-flop 111 is supplied to the input terminal D of the D flip-flop 115. The output $\overline{Q}$ from the D flip-flop 111 is set to low level, so that the output Q from the D flip-flop 115 goes low. Since the output $\overline{Q}$ from the D flip-flop 119 is set to high level and is supplied to an AND gate 116 through an inverter 144, the AND gate 116 is ON. The output from the AND gate 116 then goes high, so that the input signal "g" goes low through an inverter 143, the OR gate 105 and the inverter 106. Thus, retransmission is initiated. When the transmitter circuit 34 completes retransmitting the packet, the output signal "b" goes high. The set input terminals S of the D flip-flops 111 and 115 go low through an inverter 142. Thus, the D flip-flops 111 and 115 are initialized. When the collision signal is received from the left, the output signal "l" goes high to turn on the AND gate 109 through an inverter 110. The clock input terminal C of the D flip-flop 111 goes high. Since the delay input terminal D of the D flip-flop 111 is kept low, the output Q therefrom goes low and the output $\overline{Q}$ therefrom goes high. The clock pulse generated by the timer 107 is supplied to the clock input terminal C of a D flip-flop 120. The output Q from the D flip-flop 111 is supplied to the D flip-flop 120. Thus, the output Q from the D flip-flop 120 goes low. When the receiver circuit 35 receives a retransmitted packet from another node, the output from the NOR gate 117 goes high. When the reception of the retransmitted packet is completed, the output from the NOR gate 117 goes low. A differentiator comprising a delay element 122, an inverter 123 and a NAND gate 124 detects this transition (negative edge) after the reception is completed. The differentiator then supplies a pulse to an AND gate 125. When the output from the D flip-flop 120 is kept low and the transmission line is kept in the nonsignalling state, the pulse from the AND gate 125 is supplied to a start input terminal v of a reservation signal generator 127. The reservation signal generator 127 can be readily formed by a combination of a conventional oscillator and a timer circuit, or a shift register and a ROM which stores a reservation signal pattern. When the pulse is supplied to the start input terminal v, the reservation signal (sinusoidal wave, an arbitrary bit array, or the like) is produced from an output terminal y thereof. The reservation signal is ON for a predetermined time interval A. When the predetermined time interval A has elapsed, an end pulse is produced from an output x thereof. When an input signal is supplied to a stop input terminal w of the reservation signal generator 127 during generation of the reservation signal, the reservation signal generator 127 immediately stops generating the reservation signal and is initialized. In this case, the end pulse is not generated by the reservation signal generator 127. In the circuit shown in FIG. 10, the predetermined time interval A need be longer than at least delay time intervals in the receiver circuit 35 and the reservation signal generator 127. Therefore, the predetermined time interval A is shorter than the time interval T1. The reservation signal generator 127 generates the reservation signal from the output terminal y in response to the output pulse from the AND gate 125. The transmitter circuit 34 transmits the input signal "s" to the right of the network. If there exits a node which reserves transmission to the left, the receiver circuit 35 receives a reservation signal from the left, so that the signal "l" goes high. When the stop input terminal w of the reservation signal generator 127 goes high, the reservation signal generator 127 stops generating the reservation signal and waits for receiving the next packet. However, if there exits no node which reserves packet transmission to the left, simultaneously when the transmission of the reservation signal is completed, the end pulse is produced from the output x of the reservation signal generator 127. Thus, an RS flip-flop 126 is reset. The output Q from the RS flip-flop 126 goes low, so that the OR gate 105 is then ON. As a result, the transmitter circuit 34 restarts the packet transmission.

The mode of operation at the time of transmission and the resolution phase has been described above. The mode of operation at the time of an end of the resolution phase and collision detection at the time of reception will be described below. Assume that the receiver circuit 35 completes reception and that transmission is not performed, that is, the transmission line is kept in the nonsignalling state. An OR gate 128 is then ON. A timer 129 has the same configuration as the timer 107, except that a time interval T2 which corresponds to the pulse width of the clock pulse is longer than the sum of the time interval T1 and the predetermined time invertal A. When the OR gate 128 is turned on, the timer 129 is started. When a nonsignalling state continues for the time interval T2, the timer 129 produces a clock pulse to initialize the D flip-flop 119. The output $\bar{Q}$ from the D flip-flop 119 goes low, so that the resolution phase is terminated. The D flip-flops 111, 115 and 120 and the RS flip-flop 126 are initialized. When a reception signal is detected or the node starts transmission before the time interval T2 elapses, the OR gate 128 is turned on. A differentiator which comprises an inverter 132, a delay element 131 and a NAND gate 130 detects this transition (positive edge) and supplies a reset pulse to the timer 129. When the node receives the packet, an OR gate 133 goes high and a timer 137 is started. The timer 137 is arranged in the same manner as the timer 107 except that a time interval T3 which corresponds to the pulse width of a clock pulse generated thereby is so set as to equal to the shortest packet length. When the timer 137 generates a clock pulse during reception, a clock input terminal C of a D flip-flop 139 goes high through an inverter 138, and the output Q from the D flip-flop 139 is set to low level. When the reception is completed, a differentiator which comprises an inverter 134, a delay element 135 and a NAND gate 136 generates a pulse to reset the timer 137. The resetting pulse is then supplied to an AND gate 140. Since the output Q from the D flip-flop 139 is set to low level, this output is supplied through an inverter 141 to reset the D flip-flop 139. Meanwhile, since the output $\bar{Q}$ from the D flip-flop 139 is kept high, an AND gate 145 is kept OFF. However, when the clock pulse is not generated by the timer 137 during reception, the D flip-flop 139 is kept in the set state. The output $\bar{Q}$ from the D flip-flop 139 is kept low. For this reason, the pulse generated by the differentiator resets the timer 137. The resetting pulse is supplied through an inverter 146 to reset the D flip-flop 119. Thereafter, the resolution phase is initiated.

What is claimed is:
1. A system for resolving data collision which occurs when a multiple of conflicting nodes essentially concurrently transmit respective data packets in a local network wherein a plurality of nodes which respectively comprise processors and terminal equipment are operated in accordance with a contention system, each of said nodes comprising:
(a) transmitting means for transmitting a data packet or a signal such as a reservation signal to other nodes which are located in a first direction or a second direction along a transmission line;
(b) receiving means for receiving a data packet or a signal such as a reservation signal received from other nodes which are located in the first direction or the second direction along the transmission line;
(c) data collision detecting means for detecting data collision when said transmitting means is transmitting the data packet and said receiving means receives another packet transmitted from another node within a predetermined period of time after starting transmission of the data packet by said transmitting means;
(d) means for stopping transmission of the data packet when said data collision detecting means detects data collision;
(e) discriminating means for discriminating whether said each node is at a predetermined end of a string of a number of nodes involved in a data collision by detecting that the data packet received when said data collision detecting means detects the data collision is not received in a predetermined direction between the first and second directions;
(f) means for allowing said transmitting means to retransmit the data packet which has been stopped when said discriminating means determines that each said node is at the predetermined end of the string of the number of nodes involved in the data collision;
(g) means for allowing said transmitting means to transmit a reservation signal sufficiently shorter than the data packet in a direction opposite the predetermined direction after another node at the predetermined end completes retransmission of the data packet when said discriminating means determines that each said node is not located at the predetermined end of the string of the number of nodes involved in the data collision;
(h) means for allowing said transmitting means to transmit the data packet after transmitting the reservation signal when the reservation signal from said another node is not received by said receiving means while said transmitting means transmits the reservation signal;
(i) means for allowing said transmitting means to stop transmission of the reservation signal and for allow- ing said transmitting means to transmit the reservation signal after said another node completes retransmission of the data packet when said receiver means receives the reservation signal from said another node while said transmitting means transmits the reservation signal; and (j) retransmission end detecting means for detecting an end of retransmission of the data packets by all nodes involved in the data collision.

2. A system according to claim 1, wherein each said node comprises:

said transmitting means having first transmitting means for transmitting in the first direction and second transmitting means for transmitting in the second direction;

said receiving means having first receiving means for receiving a signal from the first direction and second receiving means for receiving a signal from the second direction;

coupling means having a directional coupler section and a directional branch section so that the signal transmitted by said first transmitting means is not received by said second receiving means and the signal transmitted by said second transmitting means is not received by said first receiving means; and means for detecting the data colllision by detecting reception of the data packet from said another node by one or both of said first and second receiving means while one or both of said first and second transmitting means is transmitting the data packet.

3. A system according to claim 2, wherein a shortest data packet length is so selected as to continue the data packet transmission for a time interval longer than the time interval required for reciprocal transmission of a signal between rightmost and leftmost nodes so as to detect the collision during the data packet transmission.

4. A system according to claim 2, wherein during a time interval required for reciprocal transmission of a signal between rightmost and leftmost nodes after the packet transmission has been initiated, one of said conflicting nodes is regarded as said leftmost node only when reception is detected in said second receiving means, whereas one of said conflicting nodes is regarded as said rightmost node only when reception is detected in said first receiving means.

5. A system according to claim 2, comprising means wherein said node which has completed retransmission after the collision occurs, and said node which was not performing transmission when the collision occurs do not perform retransmission until completion of the collision resolution is detected.

6. A system according to claim 1, comprising means for detecting a nonsignalling period of said transmission line after a final node among said conflicting no-es has completed retransmission to indicate completion of a collision resolution.

7. A system according to claim 1, comprising means responsive to a final node among said conflicting nodes for producing a special signal to said all of remaining nodes in the local network to indicate completion of a collision resolution.

8. A system according to claim 1, wherein a node which detects the data collision stops the transmission of a colliding data packet and causes a conflicting data packet length to become shorter than a normal shortest data packet, so that said node which is not involved in the collision and which was not performing transmission when the data collision occurs can also detect the collision when a length of a received data packet is shorter than the packet length.

9. A system for resolving data collision which occurs when a multiple of conflicting nodes essentially concurrently transmit respective data packets in a local network wherein a plurality of nodes which respectively comprise processors and terminal equipment are operated in accordance with a contention system, each of said nodes comprising:

(a) transmitting means for transmitting a data packet or a signal such as a reservation signal to other nodes which are located in a first direction or a second direction along a transmission line;

(b) receiving means for receiving a data packet or a signal such as a reservation signal received from other nodes which are located in the first direction or the second direction along the transmission line;

(c) data collision detecting means for detecting data collision when said transmitting means is transmitting the data packet and said receiving means receiving another packet transmitted from another node within a predetermined period of time after starting transmission of the data packet by said transmitting means;

(d) means for stopping transmission of the data packet when said data collision detecting means detects the data collision;

(e) discriminating means for discriminating whether said each node is at a predetermined end of a string of a number of nodes involved in data collision by detecting that the data packet received when said data collision detecting means detects the data collision is not received in a predetermined direction between the first and second directions;

(f) means for allowing said transmitting means to transmit a reservation signal of a length sufficiently shorter than the data packet in a direction opposite to the predetermined direction and then to retransmit the data packet which has been stopped when said discriminating means determines that said each node is at the predetermined end of the string of the number of nodes involved in the data collision;

(g) means for allowing said transmitting means to transmit a reservation signal in the direction opposite the predetermined direction after another node at the predetermined end completes retransmission of the data packet when said discriminating means determines that said each node is not located at the predetermined end of the string of the number of nodes involved in the data collision;

(h) means for allowing said transmitting means to transmit the data packet after transmitting the reservation signal when the reservation signal from said another node is not received by said receiving means while said transmitting means transmits the reservation signal;

(i) means for allowing said transmitting means to stop transmission of the reservation signal and for allowing said transmitting means to transmit the reservation signal after said another node completes retransmission of the data packet when said receiving means receives the reservation signal from said another node while said transmitting means transmits the reservation signal; and (j) retransmission end detecting means for detecting an end of retransmission of the data packets by all nodes involved in the data collision.

* * * * *